United States Patent [19]

Werdner

[11] Patent Number: 4,779,691
[45] Date of Patent: Oct. 25, 1988

[54] CROSS-COUNTRY VEHICLE

[76] Inventor: Martin Werdner, Luggwegstrasse 23, CH-8048 Zurich, Switzerland

[21] Appl. No.: 49,295
[22] PCT Filed: Jul. 30, 1986
[86] PCT No.: PCT/CH86/00111
§ 371 Date: Apr. 13, 1987
§ 102(e) Date: Apr. 13, 1987
[87] PCT Pub. No.: WO87/01082
PCT Pub. Date: Feb. 26, 1987

[30] Foreign Application Priority Data

Aug. 13, 1985 [CH] Switzerland ............ 3476/85

[51] Int. Cl.$^4$ .............................................. B62D 57/02
[52] U.S. Cl. ................................. 180/8.3; 180/8.1; 180/8.6
[58] Field of Search ............... 180/8.1, 8.3, 8.4, 8.6, 180/315

[56] References Cited

U.S. PATENT DOCUMENTS

| 4,202,423 | 5/1980 | Soto .................. 180/8 D |
| 4,265,326 | 5/1981 | Lauber ................ 180/8.1 |
| 4,558,758 | 12/1985 | Littman et al. ..... 180/140 |

FOREIGN PATENT DOCUMENTS

| 0074286 | 3/1983 | European Pat. Off. |
| 1602390 | 12/1970 | France. |
| 2403261 | 9/1977 | France. |
| 2418106 | 2/1979 | France. |
| 93455 | 3/1922 | Switzerland. |
| 508786 | 7/1971 | Switzerland. |
| 306365 | 2/1929 | United Kingdom. |

OTHER PUBLICATIONS

Robotics Age, No. 5, Sep.-Oct. 1983 Petersborough, N.H. (US), M. Russell Jr.: "Odex I, the First Functionoid", pp. 12-18, see pp. 17, 18.
Scientific America, Jan. 1983 (Monthly) (US).

Primary Examiner—John J. Love
Assistant Examiner—Donn McGiehan
Attorney, Agent, or Firm—Thomas W. Speckman; Ann W. Speckman

[57] ABSTRACT

The present invention creates a cross-country vehicle that is characterized by the combination of two hydraulically operated leg units at the front of the vehicle with two wheels at the rear of the vehicle, it being possible to adjust the height of these wheels, which are supported on longitudinal arms, hydraulically. Motion of the vehicle is effected by appropriate movements made by means of hand levers and amplifiers. An on-board computer automatically provides for a constant and near horizontal position of the vehicle cab and constantly carries out calculations to ensure that when one leg is raised the position of the center of gravity is at that moment within the three support points. The decisive point of the invention lies in the fact that the advantages of leg units are combined with the advantages of wheels. The command of the leg elements is greatly simplified since there are only two such units. The vehicle is well suited as a vehicle platform for various machinery used in forestry, by virtue of its cross-country capability.

20 Claims, 4 Drawing Sheets

CROSS-COUNTRY VEHICLE

BACKGROUND OF THE INVENTION

The present invention relates to a cross-country vehicle that moves by means of a walking motion. A vehicle of this kind, which is fitted with four leg units, is known from European patent application No. 0074286, of the International Robotic Engineering Incorporated. U.S. Pat. No. 4,202,423 (Sato) describes a vehicle that even has six leg units. Movement of the leg units to match the terrain necessitates an extremely costly control system.

Much simpler in design and in the control system that it uses is the driveable power shovel described in Swiss Patent No. CH-PS 508 (Menzi AG). This vehicle has two non-driven wheels, the height of which can be adjusted, and can move independently with the help of the shovel arm. However, it does not move in a continuous manner, since the apparatus has to be settled on its feet after each step, before the next step can be made.

SUMMARY OF THE INVENTION

It is the task of the present invention to create a cross-country vehicle that moves with a walking motion, this being simpler in design and in control requirements than known vehicles of this type, which have four or six leg units.

The invention solves this task with a vehicle having a frame to which two rear wheels are attached by means of hydraulically controlled swing arms and to which two hydraulically powered front leg units are attached, each having three degrees of freedom of movement. The cross-country vehicle of the present invention may be controlled by a driver using hand controls coupled with proportional movement and amplifying systems and an on board computer which provides positional stability of the cross-country vehicle.

A considerable simplification can be achieved in that the movements of the two leg units are controlled manually by the driver. The on-board computer serves to monitor stability, prevents the completion of incorrect steps, and monitors the position of the wheels relative to the vehicle frame.

Special hand control elements have been created for this manual control, with manual control elements for each leg unit including a pivotable lower arm support with a pivotable handle attached at its front end to provide movement of each leg unit about multiple degrees of freedom by manual manipulation.

In the simplest embodiment, the movement of the vehicle is effected solely by the movement of the leg units. When this is done, the wheels simply roll and are adjusted automatically in their position relative to the frame of the vehicle in keeping with the positional stability of the vehicle.

In difficult country, for example, if the ground is soft, so that the feet at the ends of the leg units and the wheels sink in, or if a steep stretch has to be negotiated, it is advantageous to brake the wheels or to lock them, to uncouple the swinging arms that bear the wheels from the automatic system, and in this way use the locked wheels to assist the motion of the vehicle.

BRIEF DESCRIPTION OF THE DRAWINGS

Exemplary versions of the object of the present invention are shown in simplified form in the drawings appended hereto. These drawings are as follows.

DESCRIPTION OF PREFERRED EMBODIMENTS

Figure 1:
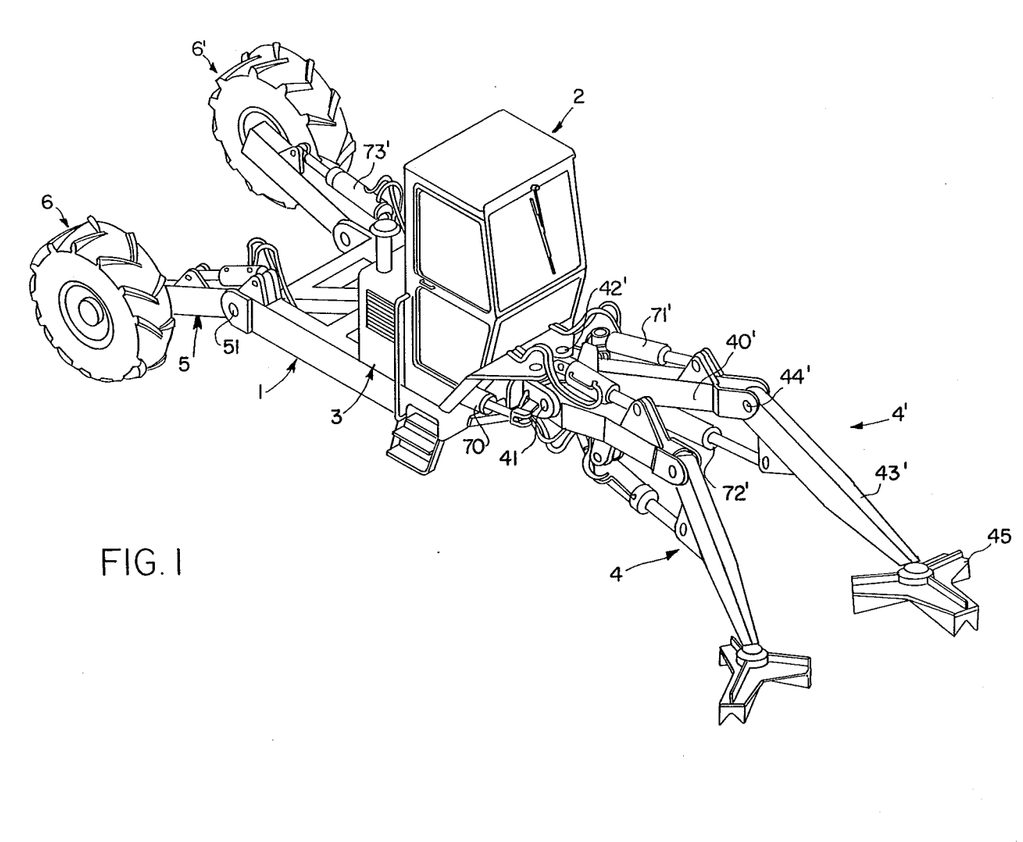
FIG. 1: is a cross-country vehicle, this being shown in perspective.

FIG. 1 shows the general construction of the vehicle as having a frame 1, a cab 2, an engine compartment 3, leg units 4, 4' that are hinged onto the front of the frame, and the two swing arms 5 that are hinged onto the rear of the frame, with the non-driven wheels 6. The wheels 6 can be provided with a service or parking brake system. The frame is a diagonally reinforced, stiff box-member frame, onto which the upper arms 40 are articulated by means of double joints about a horizontal shaft 41 and about a vertical shaft 42, this being done so as to permit them to pivot.

At the outer end of the upper arm 40 there are the lower arms 43, these being hinged onto the upper arms about a horizontal shaft 44 in such a manner as to be able to pivot. At their free ends the lower arms bear feet 45 that can be adjusted in all directions. The leg units obtain their adjustment and driving power from individual hydraulic drive elements with double acting pistons and cylinders having integrated length measurement systems. Each of the two leg units is configured and constructed in the same way. The individual components of the right-hand leg unit are numbered with normal reference numbers, whereas those of the left-hand leg unit have numbers that are followed by apostrophes.

The hydraulic drive element 70 provides for the lateral pivoting of the leg units 4, and element 71' serves to raise and lower the upper arm 40' and the element 72' provides for the forwards or backwards pivoting of the lower arm 43'.

The two swing arms 5, 5' are articulated onto the rear side of the frame, and each pivots about a horizontal shaft 51. Hydraulic drive elements 73' supply the adjustment forces for the swing arms 5, 5'.

The leg units permit the movement of the vehicle across uneven terrain, and the movement of these leg units is controlled manually by a driver, assisted by an on-board computer (to be described subsequently) which also ensures that no steps that could endanger the stability of the vehicle can be made. This computer also provides for automatic adjustment of the swing arms 5 with the wheels 6. With the most simple version of the computer, these are so controlled that the frame 1 always remains in a horizontal position. If, for example, the wheel 6 drops into a depression, the computer ensures that the swing arm 5 and the wheel 6 also drop until the vehicle frame is no longer inclined to one side.

The manual control elements are described below on the basis of FIG. 2, and then the method of operation of the on-board computer will be explained on the basis of a block-schematic diagram.

Figure 2:
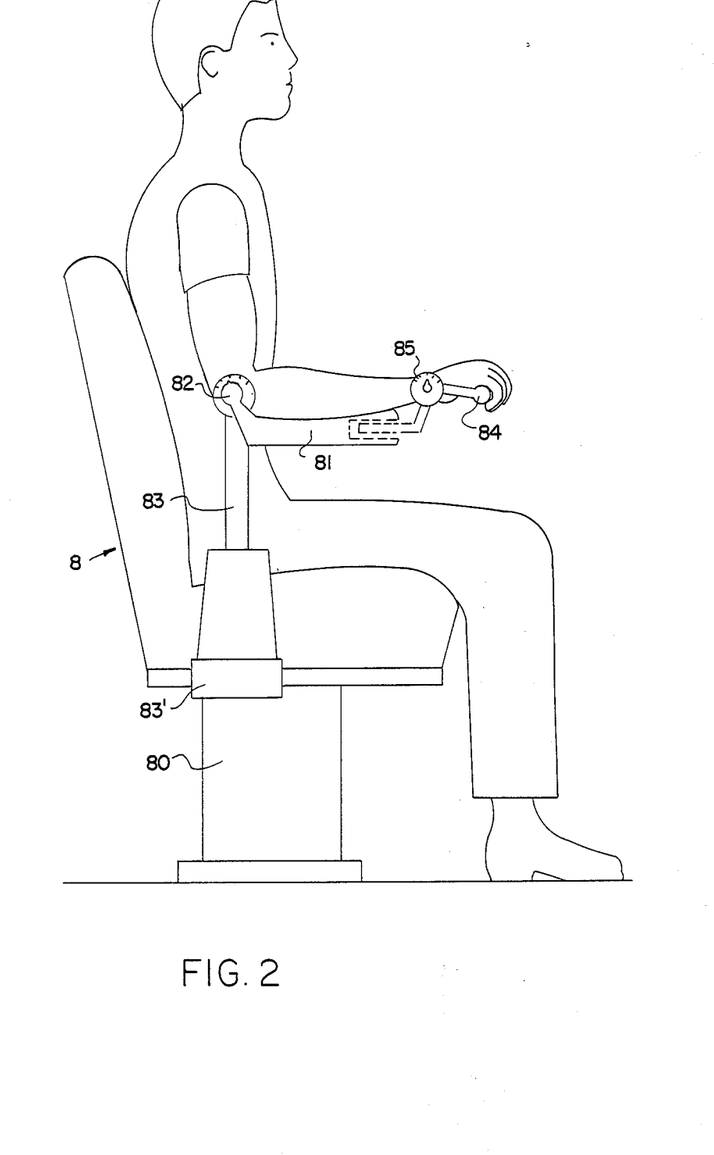
FIG. 2: shows the driver's position within the vehicle according to FIG. 1 with the hand control elements.
Figure 2A:
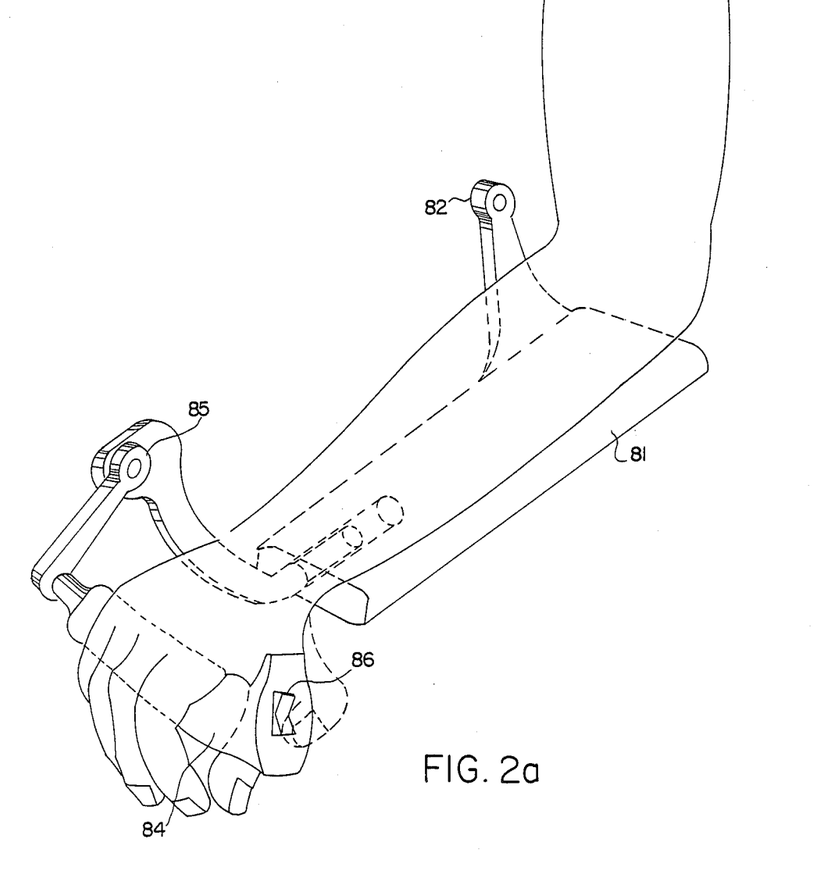
FIG. 2a shows details of the same in perspective.

FIG. 2 shows a seat 8 for the driver of the vehicle. The seat as a whole is mounted so as to be pivotable on a column 80, in order that the driver has a view in all directions. On both sides of the seat there are the control elements for the leg units. The control elements that are installed on the right-hand side serve to control the right-hand leg unit 4, whereas those on the left-hand side serve to control the left-hand leg unit 4'. The following description relates to the right-hand control element and can be seen in the drawings, although the control elements on the left-hand side are configured so as to be a mirror image of these. The vehicle is actually controlled by the driver's lower arm and hand. To this end, his lower arm rests in a lower arm support 81 which can pivot upwards and downwards about a joint 82 and the rotational axis of this is an extension of the axis of the elbow. The height of the lower arm support can be matched to the size of the operator, this being done by means of the adjusting column 83. At the front end of the lower arm support there is a handle 84 which can pivot about a joint 85. The distance between the elbow and the hand can also be adjusted to suit a particular operator. Sensors for the angle of rotation are installed in the joints 82 and 85. Pivoting the joint 82 results in a raising or lowering of the right-hand leg unit or upper arm 40, and pivoting the handle 84 results in a forwards or backwards motion of the lower arm 43 of the right-hand leg unit.

In place of this, pivoting the arm grip 84 can serve to produce a horizontal movement of the leg unit foot and pivoting about the joint 82 can generate a vertical movement of the leg unit foot, in which connection the on-board computer will have to calculate the corresponding commands in both the drive cylinders 71' and 72'.

The lateral movement of the leg unit must also be made extremely slowly and with great caution, in order that the vehicle does not lose any lateral stability and tip. Thus, in order to provide for this lateral pivoting of the leg units there are two buttons on the handle 84 or a tumbler switch 86 for a slow pivoting to the left or to the right, and these have to be operated by the driver using his right or left thumb.

Instead of this, a right-hand or left-hand pivoting could also result from a corresponding rotation of the lower arm support about the adjusting column 83, which can then activate a signal transmitter 83'.

Since there is always a danger that the operator will make pivoting movements that are too large and too rapid, it is possible that these commands could be transmitted to the driving elements suitably attenuated and delayed. However, even though all precautionary measures are taken, the vehicle will still sway a little as it moves forward, and so the push-button control system is preferred.

All the joints on the control elements are damped mechanically, in order to prevent unintentional and automatic movement of the leg units if the control elements are released by the driver.

Control is not effected directly on the hydraulic drive elements 70, 72. All the control sequels first go to the on-board computer as can be seen from the block schematic diagram shown in FIG. 4. The control signal pulses pass from the hand control elements ST to the on-board computer "COMP," which then passes them, after a reliability check, to the servo-electronic system SE, where the signals are amplified and the corresponding proportioning and metering valves are operated which then cause hydraulic oil under pressure to be delivered to the hydraulic drive element 70, 73 or release the pressurized oil from these. The on-board computer performs this control function automatically and without intervention such that the frame is always adjusted to a horizontal position. To this end, two oil damped and contactless pendulum-type potentiometers are used, a potentiometer Q for the lateral inclination and a potentiometer L serving for the longitudinal inclination of the vehicle frame.

Figure 4:
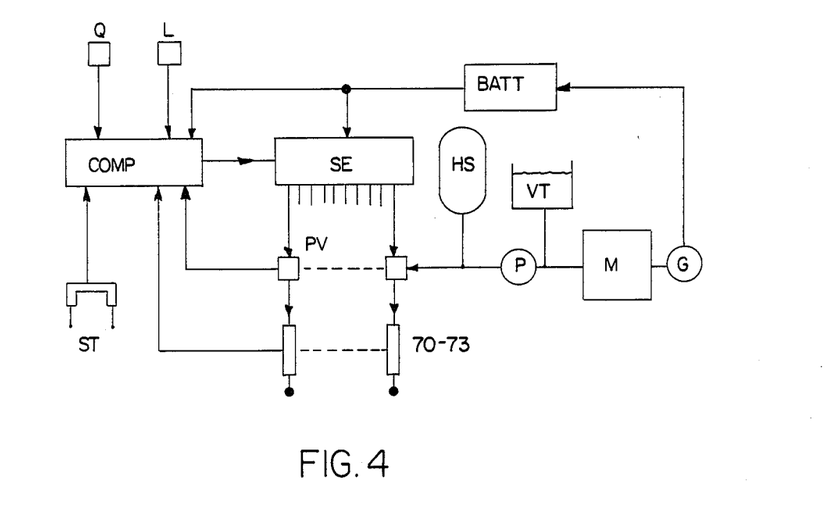
FIG. 4: is a block schematic diagram of the control system.

The control pulses from both of these potentiometers pass through the on-board computer to the servo-electronic system, and from there go to the proportional metering valves PV, and these adjust one or both swing arms 5 with the help of the hydraulic elements 73, 73' as may be necessary from time to time in order to maintain the required horizontal position.

All the hydraulic drive elements are provided with electrical positional feedback elements which tell the computer whether the current control command has been executed. For analog control or feedback pulses, the computer is preceded by an analog-digital converter (not shown herein). The on-board computer also contains a pre-programmed calculator that continuously calculates whether the vertical projection of the central gravity of the vehicle still remains within the cross sectional area of the ground-support triangles formed in each instance by the pair of wheels and one leg unit. If this is not the case, the initial raising movement of the leg unit is stopped automatically and the driver is given a warning signal.

The on-board computer can also incorporate a program to bypass manual steering for straight line travel on even ground.

The on-board computer can also be provided with programs and algorithms that permit dynamic motion control, for example, for the use of a gallop motion, in which connection the vehicle will only be in momentary contact with the ground through the wheels while both leg units are raised and in the repositioning phase.

A further program makes it possible to spread the leg units and automatically level the frame so that this forms a platform for a power shovel, a mobile crane, or another stationary machine.

The block schematic diagram also shows the vehicle energy source for controlling and moving the vehicle. An internal combustion engine M drives a pump P, which keeps the high pressure hydraulic oil reservoir HS under pressure in order that oil is immediately available under pressure. The pump is supplied from the supply tank VT into which oil also flows back from the drive element 70, 73. In addition, the motor M drives a generator G that charges the battery marked "BATT." The battery supplies the electrical energy for the on-board computer, the servo-electronic system, and the electrically operated valves PV.

Figure 3:
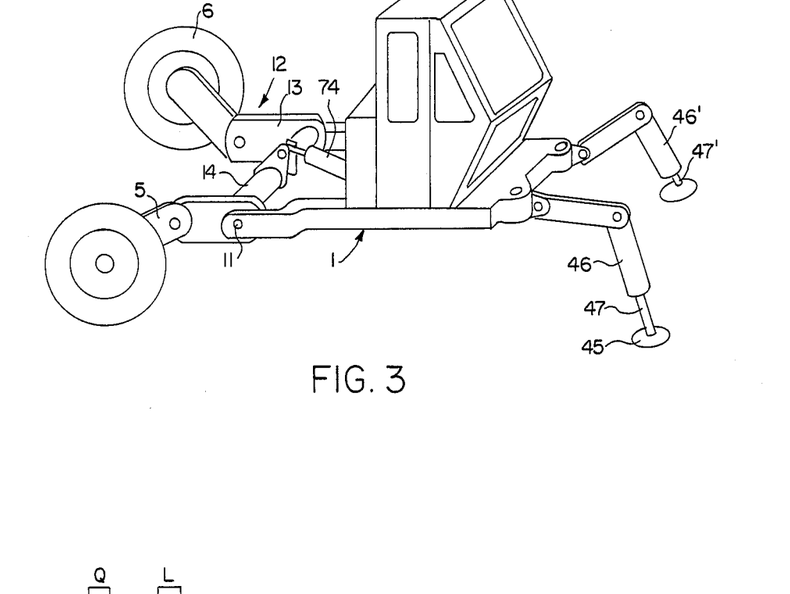
FIG. 3: is a variation of the vehicle as in FIG. 1.

FIG. 3 shows a variation of the vehicle that is shown in FIG. 1. The frame of this vehicle is pivotable about the shaft 11. This makes it possible to raise the frame to a higher level. The rear part of the frame as a complete unit is numbered 12. This includes two beams 13, that are connected to each other by a tube 14 so as to form a rigid U-shaped section of the frame. As is shown in FIG. 1, the pivotable swing arms with the wheels 6 are hinged to the beams 13. The drawing shown in FIG. 3 is greatly simplified in that this drawing does not show the hydraulic drive elements. Only the newly introduced drive elements 74 are shown in this drawing.

For the reason quoted above, i.e., to be able to raise the frame to a higher level, the lower arms 46, 46' of the leg units are provided with additional extending sections 47, 47'. In the vehicle that is shown in FIG. 3 the lower arms themselves are configured as hydraulic drives. The feet 45 are thus hinged an attached to these extending piston rods 47 so as to be self-adjusting.

The vehicle is well suited for travelling in roadless and cut terrain, as is found, for example, in forestry operations. The particular construction of the vehicle makes it possible to move across terrain that incorporates gery steep slopes. Ditches or terraced terrain can also be negotiated to a certain extent. When necessary, the vehicle can be turned in one place by means of a plurality of individual steps. In the event that the stationary vehicle is to be turned to the right, the left leg unit is raised and the vehicle is aligned on the right leg unit. Now the left leg is lowered and this sequence is repeated as often as required until the vehicle is pointing in the desired direction, e.g., has been turned through 180° on the spot. Of course, this manuvers can also be carried out when the vehicle is moving.

In order to load cargo onto the frame or in order to install special machinery, the frame can be lowered in that the vehicle "kneels." Because of the automatic equalization of the horizontal position, the rearmost part of the vehicle will also be lowered.

A suitable movement of the leg units also permits movement in reverse.

The vehicle makes it possible to move forward in a number of ways. The driver can either move the vehicle on one front leg while the other front leg is raised, or can rest both legs on the ground and move the vehicle by means of the two legs.

In the event that the vehicle has arrived at a place in which it is to be as stable as possible when at a standstill, the two legs are bent until the underside of the vehicle is lying on the ground in which connection, because of the automatic control, the wheels will automatically follow. By this means it is possible to spread the leg units wide so that the vehicle is easily raised once again.

The tension in a leg unit that is to be calculated by the computer until it has the necessary pressure on the ground can be effected by means of sensors or other means of simple pressure measurement in a cylinder, for example, cylinders 71 or 71'.

Furthermore, it is also possible to switch off part of the automatic control system so that only the automatic horizontal adjustment remains effective.

The automatic control system is then restricted to the automatic horizontal adjustment of the vehicle. All other maneuvers are then left up to the driver.

As has already been discussed, in certain situations it can be advantageous to use the braked wheels for the forward motion of the vehicle. In addition, it is not always advantageous to program the on-board computer so that the vehicle frame is alway kept in a horizontal position. In the case of very steep slopes it can, for example, happen that the force of the leg units, or the adhesion of the feet to the ground is insufficient to move the vehicle up a slope, even if all are acting at the same time.

In such a case, it may help that the swing arms 5 are pivoted forward or downwards and the wheels 6 are locked. During simultaneous forwards movement of the leg units, when the feet remain on the ground, the swing arms 5 are now moved backwards or upwards. During such a thrust and step motion the vehicle frame does not have to be kept horizontal. In the event that the vehicle has a superstructure as is shown in figure, the beams 13 can be used for balance during the movement of the swing arms 5. For the next step of this kind, the leg units will once again be moved forward until they have sufficient grip to hold the vehicle.

After this, the locking or the braking of one or both wheels can be released and the swing arm or arms can be pivoted forwards. In this position, the vehicle is ready for the next push step. This complicated type of motion is particularly advantageous when negotiating a steep slope, because the vertical component of the vehicle weight is displaced rearwards over the wheels.

A similar push step motion is also useful if the vehicle is moving on soft ground, and the wheels and the feet on the leg units sink in.

In such cases, it can be of advantage to remove the wheels and replace them with runners. The runners can be provided with means to prevent them sliding backwards. In the above-described push step type of motion the use of runners is particularly advantageous because then the operation of the alternating locking and releasing of the brakes or the parking system is no longer necessary.

I claim:

1. A cross-country vehicle for step-like locomotion across terrain, with an on-board power supply that provides the power necessary for control and movement of said vehicle, as well as for working equipment mounted on said vehicle, said vehicle comprising: a frame (1); two wheels (6, 6') attached to a rear portion of said frame (1) by means of pivotable swing arms (5, 5'), the position of each said wheel (6, 6') being adjustable by means of at least one drive element (73') pivoting a corresponding said swing arm, and said wheels (6, 6') being non-driven and lockable; two individually powered leg units (4, 4'), attached to a front portion of said frame (1), each of said leg units (4, 4') having at least three degrees of freedom of movement and being activated by means of a plurality, of drive elements (70, 71, 72, 70', 71', 72'), a foot (45, 45') pivotally connected to the outer end of each of said leg units (4, 4'), said drive elements capable of lifting said foot (45, 45') from said terrain, moving said foot (45, 45') over said terrain without said foot touching said terrain, and again touching said foot (45, 45') to said terrain whereby such movement of said foot (45, 45') propels said vehicle relative to said terrain in the desired direction of locomotion during a stride phase, said leg units (4, 4') activating the movements of said feet (45, 45') relative to said frame (1) and relative to said terrain; a computer aided manual control means for controlling said movement of said leg units (4, 4') with proportional movement- and power-amplifier systems in communication with said control means and said leg units (4, 4'); and an on-board computer (COMP) providing at least the following functions:

(a) controlling of individual adjustments of said wheels (6, 6') to maintain the positional stability of said vehicle;

(b) locking of the movement of at least one of said leg units (4, 4') until a stable vehicle position with a specific ground pressure is achieved;

(c) performing a vehicle stability calculation on the basis of a three point support position, namely, analysis, of the specific pressure of said wheels (6, 6') and of said leg units (4, 4'), to determine movement of the other said leg unit; and (d) executing different vehicle gaits resulting in at least one pattern of vehicle movement based on at least one preset control program.

2. A vehicle according to claim 1 wherein said front and rear portions of said frame (1) are pivotable about a horizontal shaft (11), and additional drive elements (74) are provided for adjustment of said front and rear portions of said frame (1) with respect to one another.

3. A vehicle according to claim 1, characterized in that each said leg unit (4, 4') comprises an upper arm (40, 40') pivotably attached to said frame (1) by means of a horizontal shaft (41, 41') and a vertical shaft (42, 42') which provide pivoting of said upper arms (40, 40') around a vertical axis and around a horizontal axis, and a lower arm (43, 43') articulated to the end of said upper arm (40, 40'), that is pivotable around at least a horizontal shaft (44, 44') which provides pivoting of said lower arms (43, 43') around at least a horizontal axis.

4. A vehicle according to claim 3 wherein said foot (45) is attached to each said lower arm (43, 43') at the ends opposite their attachment to said upper arms (40, 40').

5. A vehicle according to claim 3, characterized in that said lower arms (46, 46') of said leg units (4, 4') have an extendable section (47, 47') attached at the ends opposite their attachment to said upper arms (40, 40').

6. A cross-country vehicle according to claim 1, characterized in that said frame (1) is pivotably attached to said swing arms (5, 5') about an axis parallel to the wheel axes.

7. A cross-country vehicle according to claim 1, characterized in that a driver's seat (8) is mounted on said frame (1), and said control means for controlling movement of each said leg unit (4, 4') comprises a lower arm support (81) pivotably mounted at the side of said driver's seat, said lower arm support (81) adjustable about a rear joint (82) having a horizontal axis aligned with the elbow axis, and a pivotable handle (84) mounted at the front of said lower arm support (81), said handle (84) pivotable about a second horizontal joint pin (85), a rotational-angle signal transmitter in communication with said lower arm support (81) providing movement of said leg unit (4, 4'), and a rotational angle signal transmitter in communication with said handle (84) providing movement of said, lower arm (43, 43') of said leg unit (4, 4').

8. A vehicle according to claim 7, characterized in that switch means (86) is installed in each said handle (84) providing for the side to side pivoting of each said leg unit (4, 4').

9. A vehicle according to claim 7, characterized in that said lower arm support (81) comprises a joint having a vertical axis and a rotational angle signal transmitter (83') providing side to side pivoting of each said leg unit (4, 4').

10. A vehicle according to claim, 3, characterized in that said swing arms (5, 5') are pivotably attached to said frame (1) by means for shaft (51), and positional feedback elements for measuring ang relaying the current position angles of saig swing arms (5, 5') and said leg unit (4, 4') are provided at said shafts (41, 42, 44, 51).

11. A vehicle according to claim 3, characterized in that said swing arms (5, 5') are pivotably attached to said frame (1) by means of shaft (51), said drive elements (70-73) effect movement of said swing arms (5, 5') and said leg units (4, 4') about said shafts (41, 42, 44, 51), and positional feedback elements for measuring and relaying the current positional angles of said swing arms (5, 5') and said leg units (4, 4') are arranged on said drive elements (70-73).

12. A vehicle according to claim 11, characterized in that said drive elements comprise hydraulic cylinders (70-73), and said positional feedback elements comprise integrated length measurement means.

13. A vehicle according to claim 1, characterized in that said drive elements comprise hydraulic cylinders (70-73), and said on-board power supply comprises at least one hydraulic system with a pressure reservoir (HS), a supply tank (VT), and a pump (P) driven by an internal combustion engine (M).

14. A vehicle according to claim 15, characterized in that said control means, through said on-board computer (COMP), are in communication with two contactless, oil-damped pendulum-type potentiometers (O, L).

15. A vehicle according to claim 1, characterized in that at least said swing arms (5, 5') attached to said wheels (6, 6') are operable in synchrony with said leg units (4, 4') when said leg units (4, 4') are locked.

16. A vehicle according to claim 7 wherein said lower arm support (81) is mounted on an axially adjustable column support (83).

17. A vehicle according to claim 13 wherein said on-board power supply comprises a generator (G) charged by said internal combustion engine (M), and a battery (BATT) providing power to said on-board computer (COMP).

18. A vehicle according to claim 17 wherein said leg units (4, 4') and said swing arms (5, 5') are controlled by hydraulic drive elements (70-73), and additionally comprising a serve-electronic system (SE) in communication with said on-board computer (COMP) and a plurality of proportional metering valves (PV) in communication with said servo-electronic system (SE) and said hydraulic drive elements (70-73).

19. A cross-county vehicle for step-like locomotion across terrain, with an on-board power supply that provides the power necessary for control and movement of said vehicle, as well as for working equipment mounted on said vehicle, said vehicle comprising: (1); two runners attached to a rear portion of said frame (1) by means of pivotable swing arms (5, 5'), the position of each said runner being adjustable by means of at least one drive element (73') pivoting a corresponding said swing arm, two individually powered leg units (4, 4') attached to a front portion of said frame (1), each of said leg units (4, 4') having three degrees of freedom of movement and being activated by means of a plurality of drive elements (70, 71, 72, 70', 71', 72'), a foot (45, 45') pivotally connected to the outer end of each of said leg units (4, 4') said drive elements capable of lifting said foot (45, 45') from said terrain, moving said foot (45, 45') over said terrain without said foot touching said terrain, and again touching said foot (45, 45') to said terrain whereby such movement of said foot (45, 45') propels said vehicle relative to said terrain in the desired direction of locomotion during a stride phase, said leg units (4, 4') activating the movements of said feet (45, 45') relative to said frame (1) and relative to said terrain, a computer aided manual control means for controlling said movement of said leg unit (4, 4') with proportional movement- and power-amplifier systems in communication with said control means and said leg unit (4, 4'); and an on-board computer (COMP) that provides at least the following functions;

(a) controlling on individual adjustments of said runners to maintain the positional stability of said vehicle;

(b) locking of the movement of at least one of said leg units (4, 4′) until a stable vehicle position with a specific ground pressure is achieved;

(c) performing a vehicle stability calculation on the basis of the current three point support, namely the specific pressure of said runners and of said leg units (4, 4′), to determine movement of the other said leg unit;

(d) executing different vehicle gaits resulting in at least one pattern of vehicle movement based on at least one preset control program.

20. A vehicle according to claim 19 wherein said front and rear portions of said frame (1) are pivotable about a horizontal shaft (11), and additional drive elements (74) are provided for adjustment of said front and rear portions of said frame (1) with respect to one another.

* * * * *

UNITED STATES PATENT AND TRADEMARK OFFICE
CERTIFICATE OF CORRECTION

PATENT NO. : 4,779,691
DATED : Oct. 25, 1988
INVENTOR(S) : Martin Werder

It is certified that error appears in the above—identified patent and that said Letters Patent is hereby corrected as shown below:

In the heading under "United States Patent", delete "Werdner" and in its place insert "Werder"; and at [76] the name of the inventor is Martin Werder Signed and Sealed this Twenty-eighth Day of March, 1989

Attest:

DONALD J. QUIGG

Attesting Officer

Commissioner of Patents and Trademarks